United States Patent
Huang et al.

(10) Patent No.: US 12,066,871 B2
(45) Date of Patent: Aug. 20, 2024

(54) PORTABLE ELECTRONIC DEVICE

(71) Applicant: Acer Incorporated, New Taipei (TW)

(72) Inventors: Yi-Ta Huang, New Taipei (TW); Yu-Shih Wang, New Taipei (TW); Cheng-Nan Ling, New Taipei (TW); Chih-Chun Liu, New Taipei (TW)

(73) Assignee: Acer Incorporated, New Taipei (TW)

( * ) Notice: Subject to any disclaimer, the term of this patent is extended or adjusted under 35 U.S.C. 154(b) by 134 days.

(21) Appl. No.: 17/834,958

(22) Filed: Jun. 8, 2022

(65) Prior Publication Data

US 2023/0229202 A1 Jul. 20, 2023

(30) Foreign Application Priority Data

Dec. 30, 2021 (TW) .................................. 110149602
Dec. 30, 2021 (TW) .................................. 110149603

(51) Int. Cl.
*G06F 1/16* (2006.01)
*F16C 11/04* (2006.01)
*E05D 3/12* (2006.01)
*E05D 3/18* (2006.01)

(52) U.S. Cl.
CPC ............ *G06F 1/1681* (2013.01); *F16C 11/04* (2013.01); *G06F 1/1616* (2013.01); *E05D 3/122* (2013.01); *E05D 3/18* (2013.01); *E05Y 2999/00* (2024.05)

(58) Field of Classification Search
CPC ...... G06F 1/1681; G06F 1/1616; G06F 1/203; F16C 11/04; E05D 3/122; E05D 3/18; E05Y 2900/606
See application file for complete search history.

(56) References Cited

U.S. PATENT DOCUMENTS

| | | | |
|---|---|---|---|
| 5,102,084 A * | 4/1992 | Park | G06F 1/1616 |
| | | | 16/338 |
| 6,640,605 B2 | 11/2003 | Gitlin et al. | |
| 8,619,415 B1 | 12/2013 | Lam et al. | |
| 8,749,965 B1 | 6/2014 | Lam et al. | |
| 9,128,676 B2 | 9/2015 | Chang et al. | |
| 9,740,253 B2 * | 8/2017 | Cheng | G06F 1/1681 |
| 9,785,197 B1 | 10/2017 | Lam et al. | |
| 10,174,535 B2 * | 1/2019 | Lin | G06F 1/1681 |
| 10,281,951 B2 * | 5/2019 | Vic | E05D 3/06 |
| 10,520,990 B2 | 12/2019 | Chen et al. | |
| 10,627,874 B2 * | 4/2020 | Lin | G06F 1/1616 |
| 10,852,775 B1 | 12/2020 | Kim et al. | |

(Continued)

FOREIGN PATENT DOCUMENTS

| TW | I475948 | 3/2015 |
|---|---|---|
| TW | I507852 | 11/2015 |

(Continued)

*Primary Examiner* — Anthony M Haughton
*Assistant Examiner* — Theron S Milliser
(74) *Attorney, Agent, or Firm* — JCIPRNET

(57) ABSTRACT

A portable electronic device including a first body, a second body, and a hinge mechanism is provided. The second body is connected to the first body through the hinge mechanism, and the hinge mechanism has a rotating shaft fixed to the second body. When the second body rotates relative to the first body, the rotating shaft slides along an arc-shaped path to increase or decrease a distance between a lower edge of the second body and a back side of the first body.

10 Claims, 10 Drawing Sheets

(56) References Cited

U.S. PATENT DOCUMENTS

| | | | |
|---|---|---|---|
| 10,876,337 B2* | 12/2020 | Lin | E05D 15/06 |
| 10,890,949 B2* | 1/2021 | Ou | G06F 1/1681 |
| 10,908,653 B2* | 2/2021 | Huang | E05D 11/00 |
| 11,016,528 B2* | 5/2021 | Lin | G06F 1/1616 |
| 11,079,802 B1 | 8/2021 | Morino et al. | |
| 11,079,809 B2 | 8/2021 | Morino et al. | |
| 11,093,008 B2* | 8/2021 | Hallar | E05D 11/1028 |
| 11,214,999 B2 | 1/2022 | Wong et al. | |
| 11,216,044 B2* | 1/2022 | Ou | G06F 1/1681 |
| 11,226,651 B2 | 1/2022 | Chen et al. | |
| 11,259,428 B2* | 2/2022 | Kang | H05K 5/0226 |
| 11,266,030 B2* | 3/2022 | Kim | E05D 3/122 |
| 11,281,261 B2 | 3/2022 | Cheng et al. | |
| 11,474,569 B2 | 10/2022 | Huang et al. | |
| 11,573,598 B2 | 2/2023 | Chen et al. | |
| 11,726,531 B2* | 8/2023 | Tsai | G06F 1/1616 |
| | | | 361/679.27 |
| 2014/0009874 A1* | 1/2014 | Huang | G06F 1/162 |
| | | | 361/679.01 |
| 2017/0153677 A1* | 6/2017 | Cheng | G06F 1/1637 |
| 2017/0235337 A1* | 8/2017 | Vic | E05D 11/00 |
| | | | 361/679.55 |
| 2018/0136699 A1* | 5/2018 | Chen | G06F 1/1616 |
| 2018/0230724 A1* | 8/2018 | Lin | G06F 1/1616 |
| 2018/0239394 A1* | 8/2018 | Vic | E05D 11/00 |
| 2019/0250674 A1* | 8/2019 | Lin | G06F 1/1616 |
| 2020/0012323 A1* | 1/2020 | Huang | E05D 11/00 |
| 2020/0080357 A1* | 3/2020 | Lin | G06F 1/1616 |
| 2020/0117245 A1* | 4/2020 | Ou | H04M 1/0268 |
| 2020/0183451 A1* | 6/2020 | Lin | G06F 1/1666 |
| 2020/0329569 A1* | 10/2020 | Kim | H05K 5/0226 |
| 2020/0383220 A1* | 12/2020 | Kang | G06F 1/1616 |
| 2021/0096607 A1* | 4/2021 | Hallar | G06F 1/1681 |
| 2021/0109572 A1* | 4/2021 | Ou | H04M 1/0216 |
| 2021/0200269 A1 | 7/2021 | Chen et al. | |
| 2021/0207414 A1 | 7/2021 | Wong et al. | |
| 2021/0277693 A1 | 9/2021 | Güzeltepe et al. | |
| 2022/0091633 A1 | 3/2022 | Chen et al. | |
| 2022/0221913 A1 | 7/2022 | Huang et al. | |
| 2022/0261033 A1 | 8/2022 | Lin et al. | |
| 2022/0269315 A1* | 8/2022 | Tsai | G06F 1/1616 |
| 2022/0413564 A1 | 12/2022 | Huang et al. | |
| 2023/0014585 A1* | 1/2023 | Tang | G06F 1/1616 |
| 2023/0068228 A1* | 3/2023 | Sanchez | G06F 1/1618 |
| 2023/0139383 A1 | 5/2023 | Chen et al. | |
| 2023/0213982 A1* | 7/2023 | Huang | G06F 1/1681 |
| | | | 361/679.27 |
| 2023/0229202 A1* | 7/2023 | Huang | G06F 1/1681 |
| | | | 361/679.55 |

FOREIGN PATENT DOCUMENTS

| | | |
|---|---|---|
| TW | I540798 | 7/2016 |
| TW | I702514 | 8/2020 |
| TW | I711065 | 11/2020 |

* cited by examiner

PORTABLE ELECTRONIC DEVICE

CROSS-REFERENCE TO RELATED APPLICATION

This application claims the priority benefit of Taiwan application serial no. 110149602, filed on Dec. 30, 2021, and Taiwan application serial no. 110149603, filed on Dec. 30, 2021. The entirety of the above-mentioned patent applications is hereby incorporated by reference herein and made a part of this specification.

BACKGROUND

Technical Field

The disclosure relates to an electronic device and particularly relates to a portable electronic device.

Description of Related Art

As the computing performance of laptop computers continues to improve, the heat generated by the electronic components therein (such as the central processing unit, graphics processing unit, and other electronic components) during operation is also increasing. For this reason, it is necessary to quickly dissipate the heat to the outside, so as to prevent the performance of the laptop computers from dropping due to overheating.

Generally speaking, a laptop computer is composed of a first body and a second body that are pivotally connected to each other. The first body has the capability of logical operation and data access, and the second body has the capability of displaying images. Because the heat sources (such as the central processing unit, graphics processing unit, and other electronic components) of the laptop computer are mostly located inside the first body, the back side of the first body is provided with a corresponding heat dissipation opening for discharging hot air from the inside of the first body to the outside. However, since the lower edge of the second body is pivotally connected to the back side of the first body, after the second body rotates and unfolds relative to the first body, the lower edge of the second body moves close to the back side of the first body and blocks the path for discharging the hot air, which results in poor heat dissipation efficiency.

SUMMARY

The disclosure provides a portable electronic device with excellent heat dissipation efficiency.

An embodiment of the disclosure provides a portable electronic device, which includes a first body, a second body, and a hinge mechanism. The hinge mechanism includes a first bracket fixed to the first body, a rotating shaft fixed to the second body, a second bracket rotatably connected to the first bracket, a third bracket rotatably connected to the rotating shaft, a first gear fixed to the rotating shaft, a second gear rotatably disposed on the third bracket, and a third gear rotatably disposed on the third bracket. The first bracket has a guide groove. The second bracket includes a rack portion located on one side of the guide groove. The second gear meshes with the first gear. The third gear meshes with the second gear and the rack portion. When the rotating shaft rotates with the second body relative to the first body, the first gear drives the second gear to rotate, and the second gear drives the third gear to rotate, so that the third gear slides relative to the rack portion and drives the third bracket to slide along the guide groove, causing the rotating shaft to slide along an arc-shaped path to increase or decrease a distance between a lower edge of the second body and a back side of the first body.

An embodiment of the disclosure provides a portable electronic device, which includes a first body, a second body, and a hinge mechanism. The hinge mechanism includes a first bracket fixed to the first body, a rotating shaft fixed to the second body, a second bracket rotatably connected to the first bracket, a third bracket rotatably connected to the rotating shaft, a first gear fixed to the rotating shaft, a second gear rotatably disposed on the third bracket, a third gear rotatably disposed on the third bracket, and a fourth gear that is coaxial with the third gear. The first bracket has a guide groove. The second bracket includes a rack portion located on one side of the guide groove. The second gear meshes with the first gear. The third gear meshes with the second gear, and the number of teeth of the third gear is smaller than the number of teeth of the first gear. The fourth gear meshes with the rack portion, and the number of teeth of the fourth gear is greater than the number of teeth of the third gear. When the rotating shaft rotates with the second body relative to the first body, the first gear drives the second gear to rotate, the second gear drives the third gear to rotate, and the third gear rotates synchronously with the fourth gear, so that the fourth gear slides relative to the rack portion and drives the third bracket to slide along the guide groove, causing the rotating shaft to slide along an arc-shaped path to increase or decrease a distance between a lower edge of the second body and a back side of the first body.

Based on the above, as the second body rotates relative to the first body, the second body slides relative to the first body to adjust the distance between the lower edge of the second body and the back side of the first body. Further, when the second body rotates and unfolds relative to the first body through the hinge mechanism, the lower edge of the second body slides in a direction away from the back side of the first body to prevent blocking the heat dissipation path on the back side of the first body (that is, the path for discharging the hot air inside the first body to the outside), so as to quickly discharge the hot air from the inside of the first body to the outside. Therefore, the portable electronic device according to the disclosure has excellent heat dissipation efficiency.

In order to make the above-mentioned features and advantages of the disclosure easier to understand, exemplary embodiments are described in detail hereinafter with reference to the accompanying drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1A:
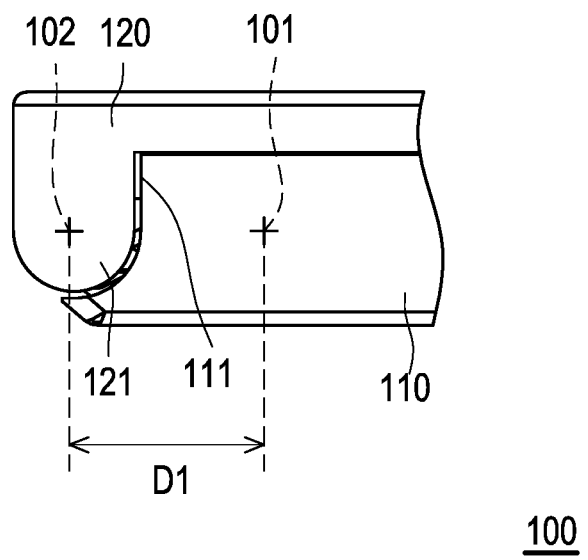
FIG. 1A is a schematic partial side view of a portable electronic device in a folded state according to an embodiment of the disclosure.
Figure 1B:
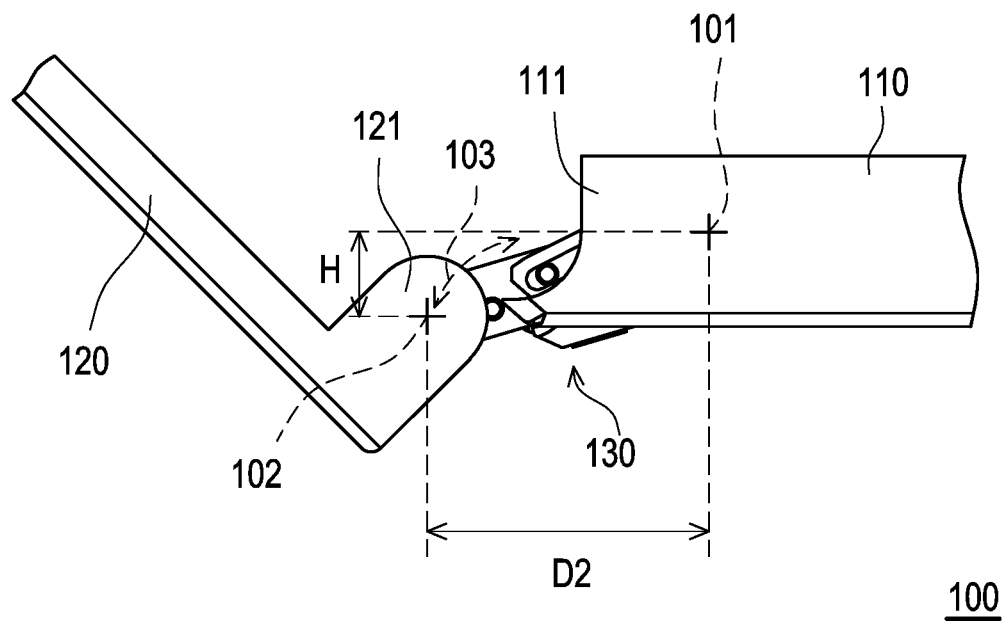
FIG. 1B is a schematic partial side view of the portable electronic device of FIG. 1A turned into an unfolded state.

FIG. 1A is a schematic partial side view of a portable electronic device in a folded state according to an embodiment of the disclosure. FIG. 1B is a schematic partial side view of the portable electronic device of FIG. 1A turned into an unfolded state. Referring to FIG. 1A and FIG. 1B, in this embodiment, a portable electronic device 100 may be a laptop computer, and include a first body 110, a second body 120, and a hinge mechanism 130. The first body 110 has the capability of logic operation and data access, and the second body 120 has the capability of displaying images. The first body 110 is connected to the second body 120 through the hinge mechanism 130, and the hinge mechanism 130 allows the second body 120 to rotate and slide relative to the first body 110.

Specifically, the hinge mechanism 130 has a reference axis 101 located on a back side 111 of the first body 110, and a rotation axis 102 located at a lower edge 121 of the second body 120. When the second body 120 rotates and unfolds relative to the first body 110, the rotation axis 102 rotates with the second body 120 relative to the reference axis 101, and slides along an arc-shaped path 103 to increase or decrease a distance between the rotation axis 102 and the reference axis 101, thereby increasing or decreasing a distance between the back side 111 of the first body 110 and the lower edge 121 of the second body 120.

When the portable electronic device 100 is in the folded state shown in FIG. 1A, the horizontal distance between the rotation axis 102 and the reference axis 101 is D1. In the process that the portable electronic device 100 turns from the folded state shown in FIG. 1A into the unfolded state shown in FIG. 1B, the rotation axis 102 slides along the arc-shaped path 103 and slides away from the reference axis 101. Finally, as shown in FIG. 1B, the horizontal distance between the rotation axis 102 and the reference axis 101 increases to D2.

Further, as the horizontal distance between the rotation axis 102 and the reference axis 101 increases from D1 to D2, the lower edge 121 of the second body 120 slides away from the back side 111 of the first body 110 (that is, the distance between the lower edge 121 of the second body 120 and the back side 111 of the first body 110 is increased) to prevent blocking a heat dissipation opening located on the back side 111 of the first body 110 or prevent blocking a heat dissipation path (that is, a path for discharging hot air inside the first body 110 to the outside) located on the back side 111 of the first body 110, so that the hot air can be quickly discharged from the inside of the first body 110 to the outside, thereby improving the heat dissipation efficiency.

On the other hand, in the folded state shown in FIG. 1A, the rotation axis 102 and the reference axis 101 may be located on the same horizontal line or the same horizontal plane, so that there is no vertical drop between the rotation axis 102 and the reference axis 101. In the process of turning from the folded state shown in FIG. 1A into the unfolded state shown in FIG. 1B, the rotation axis 102 slides away from the reference axis 101 along the arc-shaped path 103 and descends relative to the reference axis 101, so that a vertical drop H is generated between the rotation axis 102 and the reference axis 101. At the same time, the lower edge 121 of the second body 120 descends relative to the back side 111 of the first body 110 and lifts the back side 111 of the first body 110, so that there is a sufficient air intake space between the bottom of the first body 110 and a working plane (such as a desktop).

Further, in the process that the portable electronic device 100 turns from the unfolded state shown in FIG. 1B into the folded state shown in FIG. 1A, the rotation axis 102 slides in a direction toward the reference axis 101 along the arc-shaped path 103, so that the horizontal distance between the rotation axis 102 and the reference axis 101 decreases from D2 to D1. In addition, the lower edge 121 of the second body 120 ascends and slides close to the back side 111 of the first body 110 to decrease the distance between the lower edge 121 of the second body 120 and the back side 111 of the first body 110 until the lower edge 121 of the second body 120 comes into contact with the back side 111 of the first body 110.

Figure 2A:
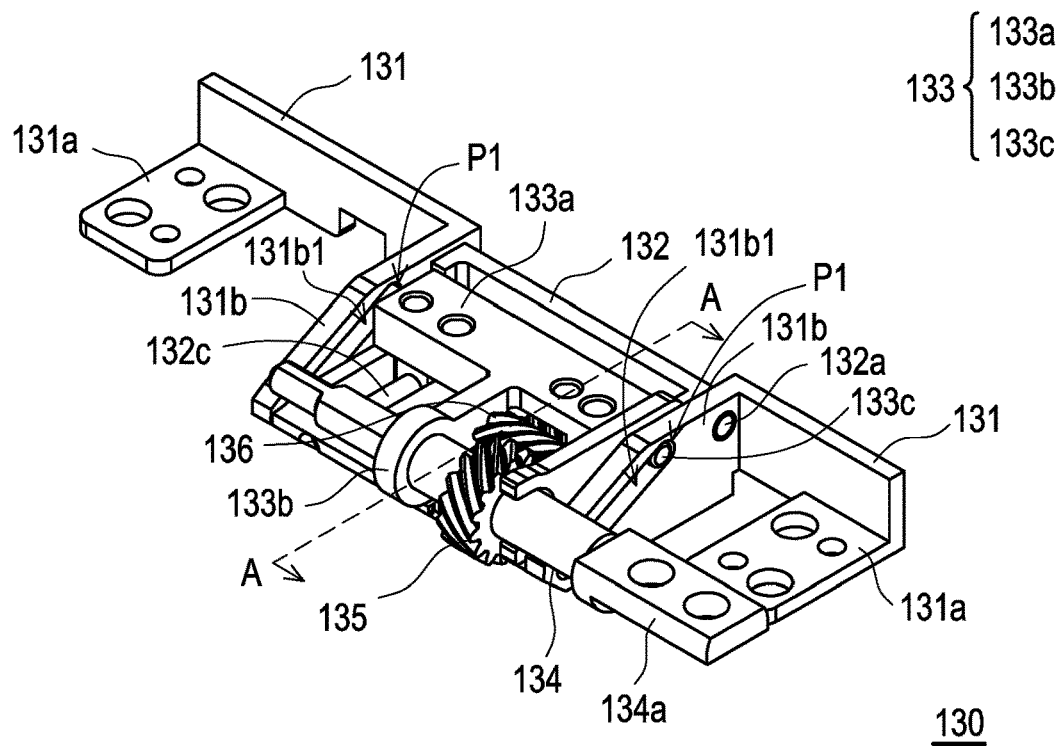
FIG. 2A is a schematic view of a hinge mechanism corresponding to the folded state of the portable electronic device according to an embodiment of the disclosure.
Figure 2B:
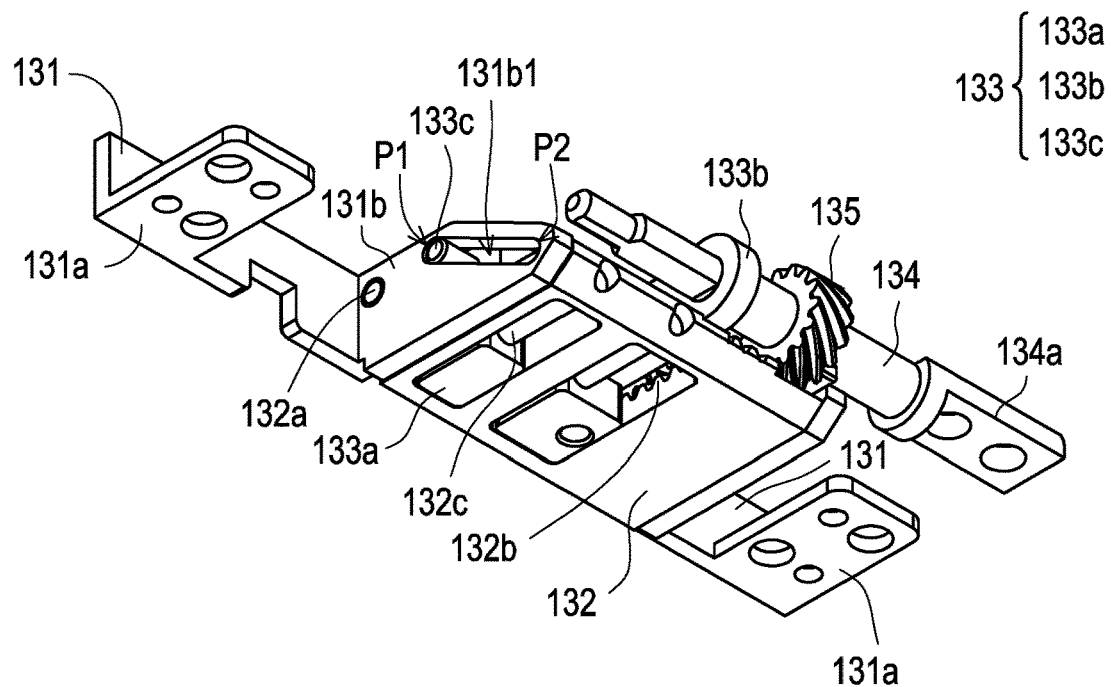
FIG. 2B is a schematic view of FIG. 2A from another viewing angle.
Figure 2C:
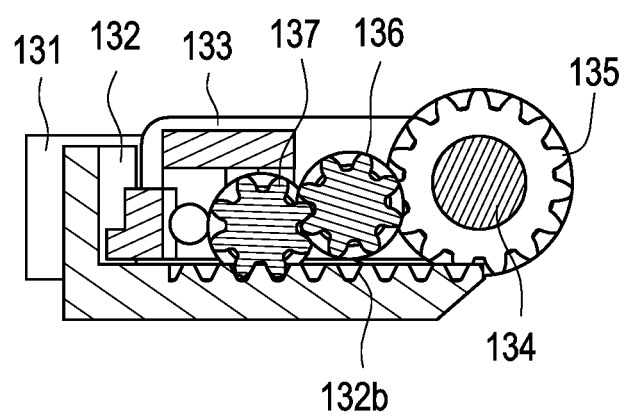
FIG. 2C is a schematic cross-sectional view of FIG. 2A along the section line A-A.

FIG. 2A is a schematic view of the hinge mechanism corresponding to the folded state of the portable electronic device according to an embodiment of the disclosure. FIG. 2B is a schematic view of FIG. 2A from another viewing angle. FIG. 2C is a schematic cross-sectional view of FIG. 2A along the section line A-A. Referring to FIG. 1A and FIG. 2A, in this embodiment, the hinge mechanism 130 includes a first bracket 131, a second bracket 132, a third bracket 133, and a rotating shaft 134. A fixing portion 131a of the first bracket 131 is fixed to the back side 111 of the first body 110, and a fixing portion 134a of the rotating shaft 134 is fixed to the lower edge 121 of the second body 120, so that the rotating shaft 134 can move synchronously with the second body 120.

Referring to FIG. 2A and FIG. 2B, two first brackets 131 may be provided and disposed in parallel. Specifically, each of the first brackets 131 includes a bearing portion 131b connected to the fixing portion 131a, and two bearing portions 131b are located between the two fixing portions 131a. Further, the second bracket 132 is disposed between the two first brackets 131 and is rotatably connected to the two first brackets 131. In addition, the second bracket 132 includes two pivot shafts 132a disposed opposite to each other, and the two pivot shafts 132a are pivotally connected to the two bearing portions 131b of the two first brackets 131 respectively, which allows the second bracket 132 to rotate relative to the first bracket 131. More specifically, the rotating shaft 134 is parallel to the pivot shaft 132a, wherein the reference axis 101 passes through the pivot shaft 132a, and the rotation axis 102 passes through the rotating shaft 134. That is, the reference axis 101 is parallel to the rotation axis 102.

Referring to FIG. 2A to FIG. 2C, in this embodiment, the third bracket 133 is disposed on the second bracket 132 and located between the two first brackets 131. Specifically, the third bracket 133 is rotatably connected to the rotating shaft 134 and slidably connected to the two first brackets 131. More specifically, the bearing portion 131b of each first bracket 131 has a guide inclined groove 131b1, and the guide inclined groove 131b1 is located between the pivot shaft 132a and the rotating shaft 134.

The third bracket 133 includes a bracket body 133a, a pivot portion 133b protruding from the bracket body 133a and extending to the rotating shaft 134, and two sliding protruding pins 133c protruding from two opposite sides of the bracket body 133a, wherein the bracket body 133a is disposed on the second bracket 132, and the pivot portion 133b is pivotally connected to the rotating shaft 134. In addition, the two sliding protruding pins 133c are slidably inserted into the two guide inclined grooves 131b1 of the two first brackets 131 respectively, which allows the third bracket 133 to stably slide relative to the two first brackets 131 under the guidance of the two guide inclined grooves 131b1.

As shown in FIG. 2B, each guide inclined groove 131b1 has a first stroke end point P1 and a second stroke end point P2 opposite to the first stroke end point P1, wherein the first stroke end point P1 is located between the pivot shaft 132a and the second stroke end point P2, and the second stroke end point P2 is located between the first stroke end point P1 and the rotating shaft 134. That is, the first stroke end point P1 and the second stroke end point P2 are located between the pivot shaft 132a and the rotating shaft 134.

Figure 3A:
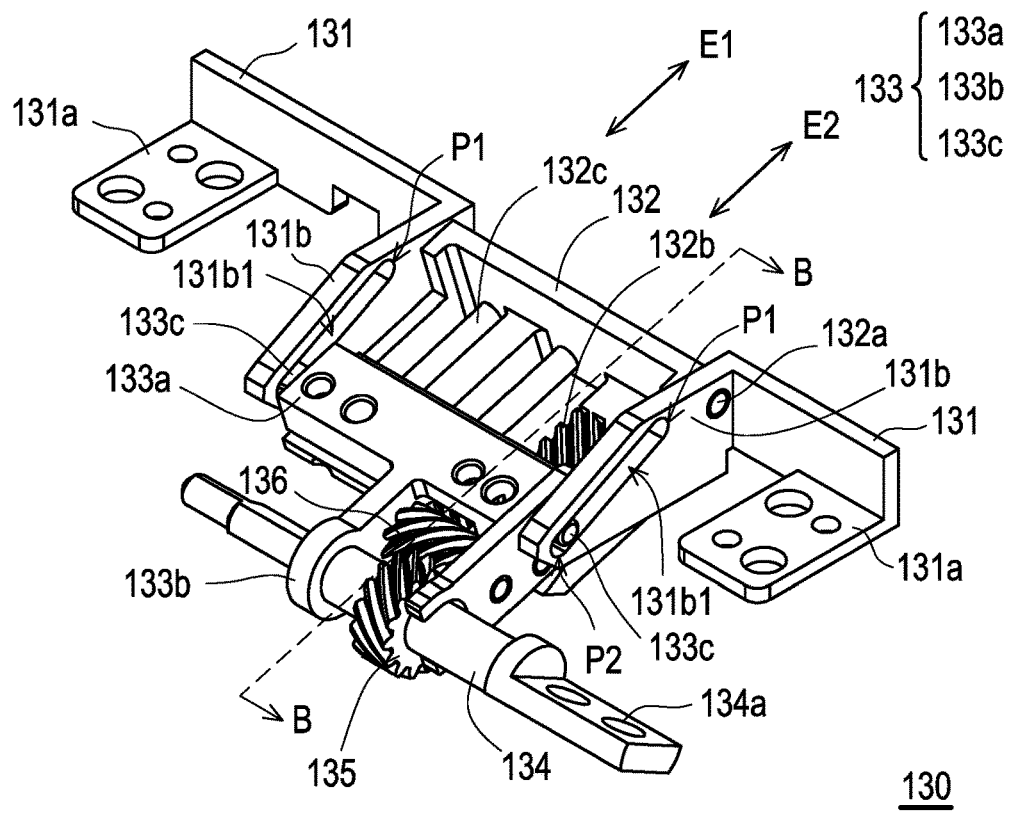
FIG. 3A is a schematic view of the hinge mechanism corresponding to the unfolded state of the portable electronic device according to an embodiment of the disclosure.
Figure 3B:
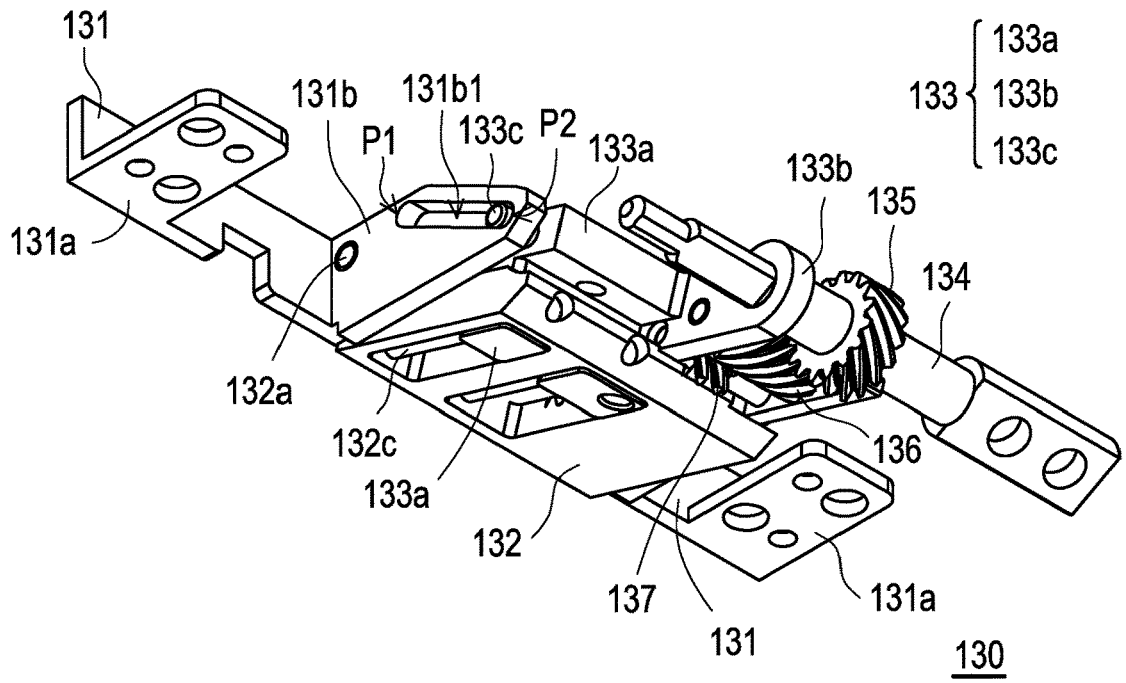
FIG. 3B is a schematic view of FIG. 3A from another viewing angle.
Figure 3C:
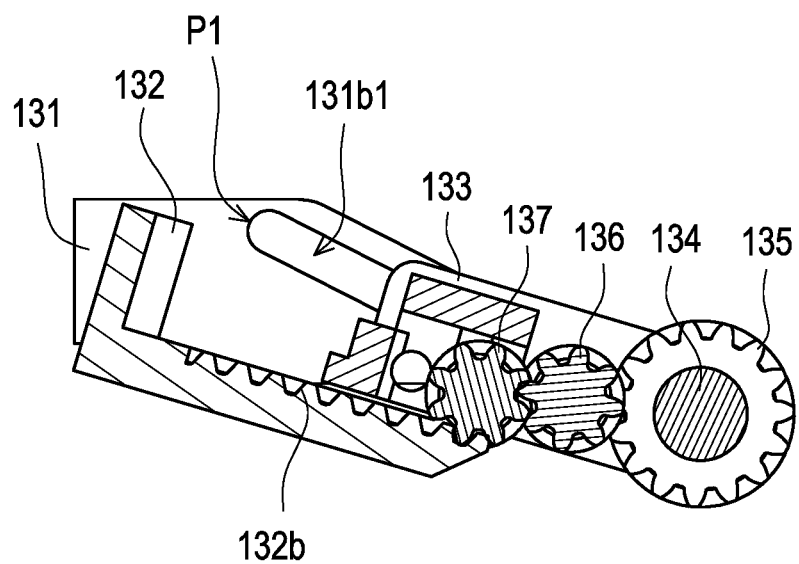
FIG. 3C is a schematic cross-sectional view of FIG. 3A along the section line B-B.

FIG. 3A is a schematic view of the hinge mechanism corresponding to the unfolded state of the portable electronic device according to an embodiment of the disclosure. FIG. 3B is a schematic view of FIG. 3A from another viewing angle. FIG. 3C is a schematic cross-sectional view of FIG. 3A along the section line B-B. Referring to FIG. 2A, FIG. 2B, FIG. 3A, and FIG. 3B, there is a height difference between the first stroke end point P1 and the second stroke end point P2, and when each sliding protruding pin 133c slides from the first stroke end point P1 to the second stroke end point P2, the rotating shaft 134 descends relative to the two first brackets 131 with the third bracket 133. Correspondingly, the lower edge 121 of the second body 120 descends relative to the back side 111 of the first body 110 and slides away from the back side 111 of the first body 110 to increase the distance between the lower edge 121 of the second body 120 and the back side 111 of the first body 110, as shown in FIG. 1A and FIG. 1B.

Conversely, as shown in FIG. 1A, FIG. 1B, FIG. 2B, and FIG. 3B, when each sliding protruding pin 133c slides from the second stroke end point P2 to the first stroke end point P1, the rotating shaft 134 ascends relative to the two first brackets 131 with the third bracket 133. Correspondingly, the lower edge 121 of the second body 120 ascends relative to the back side 111 of the first body 110 and slides close to the back side 111 of the first body 110 to decrease the distance between the lower edge 121 of the second body 120 and the back side 111 of the first body 110.

As shown in FIG. 2B and FIG. 3B, in this embodiment, the first stroke end point P1 is close to the pivot shaft 132a, and the second stroke end point P2 is close to the rotating shaft 134. When each sliding protruding pin 133c slides from the first stroke end point P1 to the second stroke end point P2, the sliding protruding pin 133c slides in a direction away from the pivot shaft 132a, or in other words, the sliding protruding pin 133c slides in a direction close to the rotating shaft 134. Conversely, when each sliding protruding pin 133c slides from the second stroke end point P2 to the first stroke end point P1, the sliding protruding pin 133c slides in a direction close to the pivot shaft 132a, or in other words, the sliding protruding pin 133c slides in a direction away from the rotating shaft 134.

Referring to FIG. 1A, FIG. 1B, FIG. 2A, and FIG. 3A, the reference axis 101 passes through the pivot shaft 132a, and the pivot shaft 132a is not allowed to slide in the horizontal and vertical directions. In addition, the rotation axis 102 passes through the rotating shaft 134. When the second body 120 rotates relative to the first body 110, the rotation axis 102 moves synchronously with the rotating shaft 134 to descend relative to the reference axis 101 and slide away from the reference axis 101, or ascend relative to the reference axis 101 and slide close to the reference axis 101. Further, because the rotation axis 102 and the rotating shaft 134 are not only allowed to rotate but also allowed to slide in the horizontal and vertical directions, when the second body 120 rotates relative to the first body 110, the rotation axis 102 and the rotating shaft 134 slide along the arc-shaped path 103 to slide away from or close to the reference axis 101 and the pivot shaft 132a.

Referring to FIG. 2A, FIG. 2C, FIG. 3A, and FIG. 3C, in this embodiment, the hinge mechanism 130 further includes a first gear 135, a second gear 136, and a third gear 137, wherein the first gear 135 is fixed to the rotating shaft 134, and the second gear 136 and the third gear 137 are rotatably disposed on the third bracket 133. Specifically, the second gear 136 is located between the first gear 135 and the third gear 137, wherein the second gear 136 meshes with the first gear 135, and the third gear 137 meshes with the second gear 136.

On the other hand, the second bracket 132 further includes a rack portion 132b, and the rack portion 132b is located between the two first brackets 131. Further, the rack portion 132b is located between the two bearing portions 131b and is located on one side of any one of the guide inclined grooves 131b1. In this embodiment, the third gear 137 meshes with the rack portion 132b, wherein the first gear 135, the second gear 136, and the third gear 137 are helical gears, and the rack portion 132b is a helical rack portion. The rotation axes of the first gear 135, the second gear 136, and the third gear 137 are parallel to one another, wherein the second gear 136 and the third gear 137 have the same number of teeth, and the number of teeth of the second gear 136 is smaller than the number of teeth of the first gear 135.

When the rotating shaft 134 rotates with the second body 120 (see FIG. 1A and FIG. 1B) relative to the first body 110 (see FIG. 1A and FIG. 1B), the first gear 135 rotates synchronously with the rotating shaft 134 and drives the second gear 136 to rotate. At the same time, the second gear 136 drives the third gear 137 to rotate, so that the third gear 137 slides relative to the rack portion 132b, and drives the third bracket 133 to slide along the guide inclined grooves 131b1 for the rotating shaft 134 to slide along the arc-shaped path 103 (see FIG. 1A and FIG. 1B), thereby increasing or decreasing the distance between the lower edge 121 (see FIG. 1A and FIG. 1B) of the second body 120 and the back side 111 (see FIG. 1A and FIG. 1B) of the first body 110.

Referring to FIG. 2A, FIG. 2B, FIG. 3A, and FIG. 3B, in this embodiment, the second bracket 132 further includes a guide rod 132c located on one side of the rack portion 132b, wherein the third bracket 133 is slidably connected to the guide rod 132c and is located between the two first brackets 131. Further, the guide rod 132c is located between the two bearing portions 131b and is located on one side of any one of the guide inclined grooves 131b1. On the other hand, the bracket body 133a is slidably connected to the guide rod 132c, and an extending direction E1 of the guide rod 132c is parallel to an extending direction E2 of the rack portion 132b to improve the sliding stability of the third bracket 133.

Figure 4A:
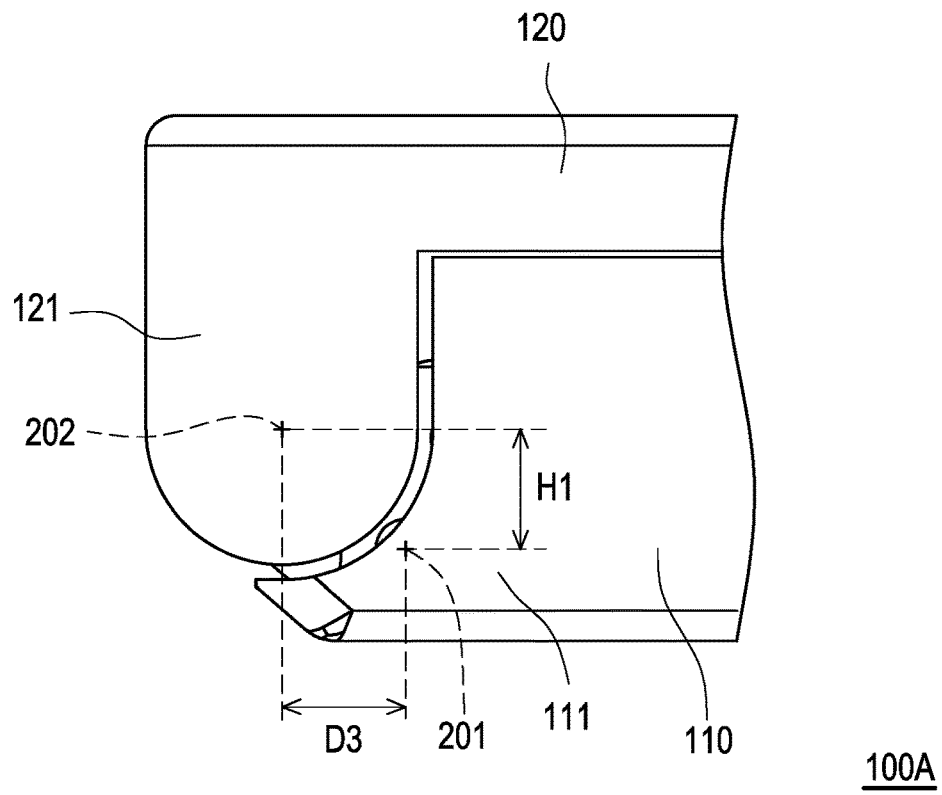
FIG. 4A is a schematic partial side view of a portable electronic device in a folded state according to another embodiment of the disclosure.
Figure 4B:
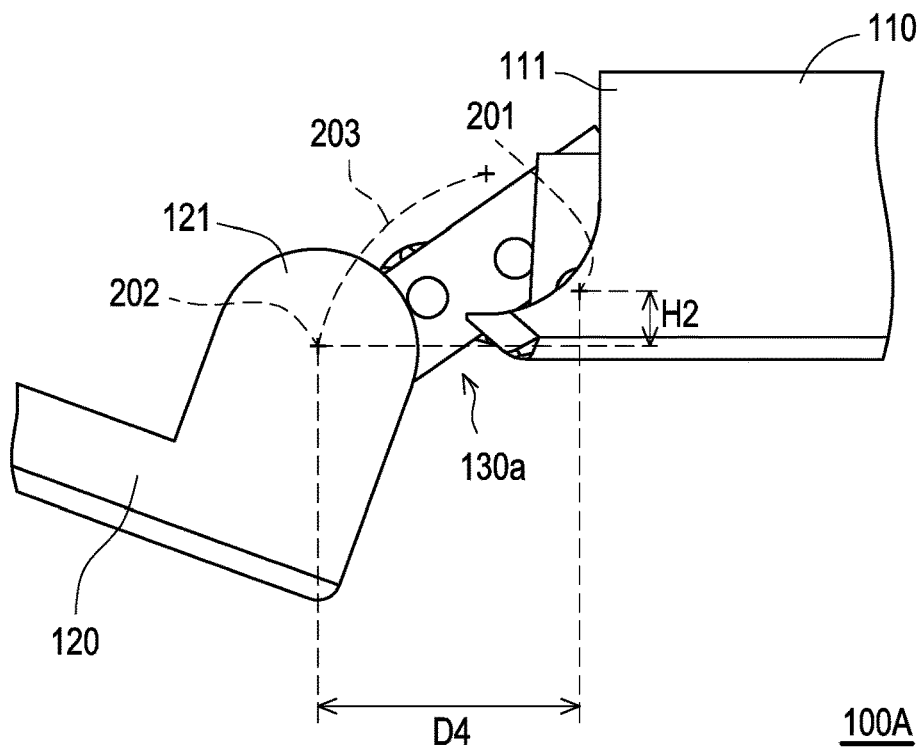
FIG. 4B is a schematic partial side view of the portable electronic device of FIG. 4A turned into an unfolded state.

FIG. 4A is a schematic partial side view of a portable electronic device in a folded state according to another embodiment of the disclosure. FIG. 4B is a schematic partial side view of the portable electronic device of FIG. 4A turned into an unfolded state. Referring to FIG. 4A and FIG. 4B, the design principle of a portable electronic device 100A of this embodiment is substantially the same as the design principle of the portable electronic device 100 of the previous embodiment, and the main difference between the two devices lies in the relative positions of the reference axis and the rotation axis and the structural design of the hinge mechanism.

In this embodiment, the second body 120 is connected to the first body 110 through a hinge mechanism 130a, and the hinge mechanism 130a has a reference axis 201 located on the back side 111 of the first body 110 and a rotation axis 202 located at the lower edge 121 of the second body 120. When the second body 120 rotates and unfolds relative to the first body 110, the rotation axis 202 rotates with the second body 120 relative to the reference axis 201, and slides along an arc-shaped path 203 to increase or decrease the distance between the rotation axis 202 and the reference axis 201, thereby increasing or decreasing the distance between the back side 111 of the first body 110 and the lower edge 121 of the second body 120.

When the portable electronic device 100A is in the folded state shown in FIG. 4A, there is a vertical drop H1 between the reference axis 201 and the rotation axis 202, and the rotation axis 202 is higher than the reference axis 201. In addition, in the folded state shown in FIG. 4A, the horizontal distance between the rotation axis 202 and the reference axis 201 is D3. When the portable electronic device 100A turns from the folded state shown in FIG. 4A into the unfolded state shown in FIG. 4B, the vertical drop between the reference axis 201 and the rotation axis 202 is reduced to H2, and the rotation axis 202 is lower than the reference axis 201. In addition, in the unfolded state shown in FIG. 4B, the horizontal distance between the rotation axis 202 and the reference axis 201 increases to D4.

Figure 5A:
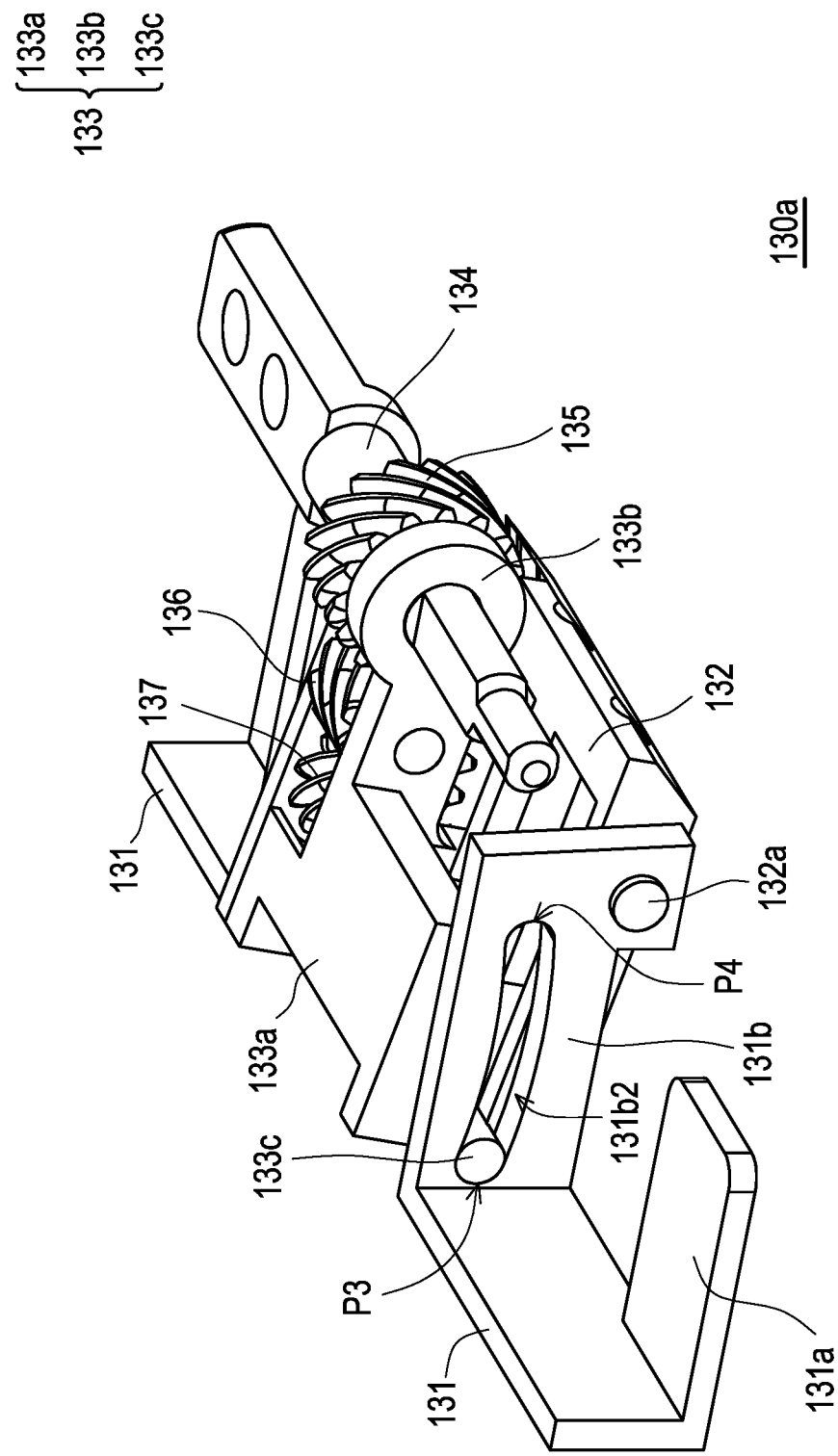
FIG. 5A is a schematic view of a hinge mechanism corresponding to the folded state of the portable electronic device according to another embodiment of the disclosure.
Figure 5B:
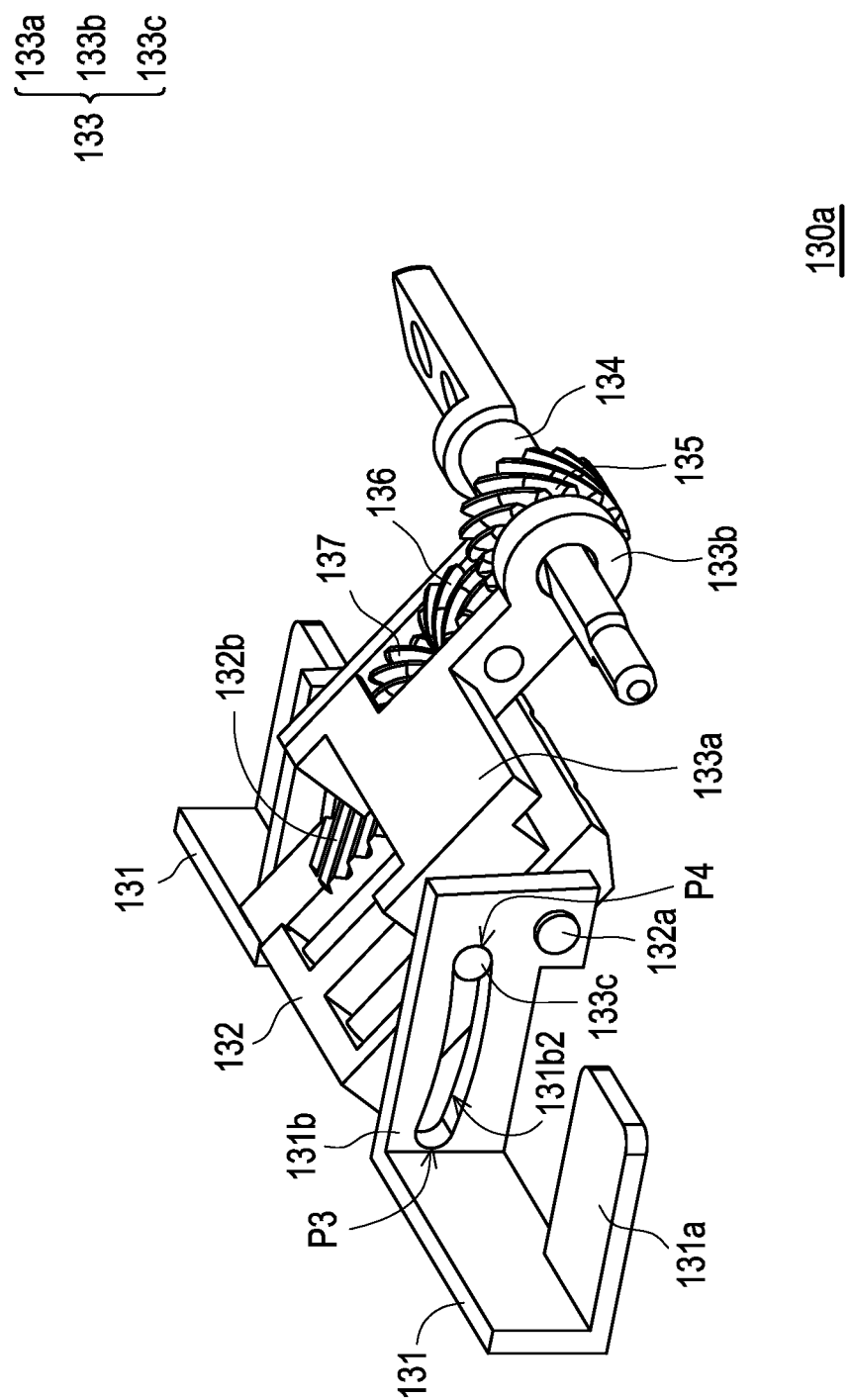
FIG. 5B is a schematic view of the hinge mechanism corresponding to the unfolded state of the portable electronic device according to another embodiment of the disclosure.

FIG. 5A is a schematic view of a hinge mechanism corresponding to the folded state of the portable electronic device according to another embodiment of the disclosure. FIG. 5B is a schematic view of the hinge mechanism corresponding to the unfolded state of the portable electronic device according to another embodiment of the disclosure. Referring to FIG. 5A and FIG. 5B, the guide groove on the bearing portion 131b of the first bracket 131 of the hinge mechanism 130a is a guide arc-shaped groove 131b2, and the pivot shaft 132a of the second bracket 132 is disposed between the guide arc-shaped groove 131b2 and the rotating shaft 134. Further, the second bracket 132 is rotatably connected to the first bracket 131 through the pivot shaft 132a, and the third bracket 133 is slidably connected to the bearing portion 131b of the first bracket 131 through the sliding protruding pin 133c. Furthermore, the sliding protruding pin 133c is slidably connected to the guide arc-shaped groove 131b2, so that the third bracket 133 can slide relative to the second bracket 132 under the guidance of the guide arc-shaped groove 131b2.

Referring to FIG. 4A to FIG. 5B, the guide arc-shaped groove 131b2 has a first stroke end point P3 and a second stroke end point P4, and the second stroke end point P4 is closer to the pivot shaft 132a than the first stroke end point P3. That is, the second stroke end point P4 is located between the first stroke end point P3 and the pivot shaft 132a. In addition, the pivot shaft 132a is located between the second stroke end point P4 and the rotating shaft 134. When the sliding protruding pin 133c slides from the first stroke end point P3 to the second stroke end point P4, the sliding protruding pin 133c slides in a direction close to the pivot shaft 132a and the rotating shaft 134. Conversely, when the sliding protruding pin 133c slides from the second stroke end point P4 to the first stroke end point P3, the sliding protruding pin 133c slides in a direction away from the pivot shaft 132a and the rotating shaft 134.

Furthermore, the reference axis 201 passes through the pivot shaft 132a, and the rotation axis 202 passes through the rotating shaft 134. When the sliding protruding pin 133c slides from the first stroke end point P3 to the second stroke end point P4, the rotating shaft 134 slides along the arc-shaped path 203, so that the lower edge 121 of the second body 120 descends relative to the back side 111 of the first body 110 and slides away from the back side 111 of the first body 110. Conversely, when the sliding protruding pin 133c slides from the second stroke end point P4 to the first stroke end point P3, the rotating shaft 134 slides along the arc-shaped path 203, so that the lower edge 121 of the second body 120 ascends relative to the back side 111 of the first body 110 and slides close to the back side 111 of the first body 110.

Figure 6A:
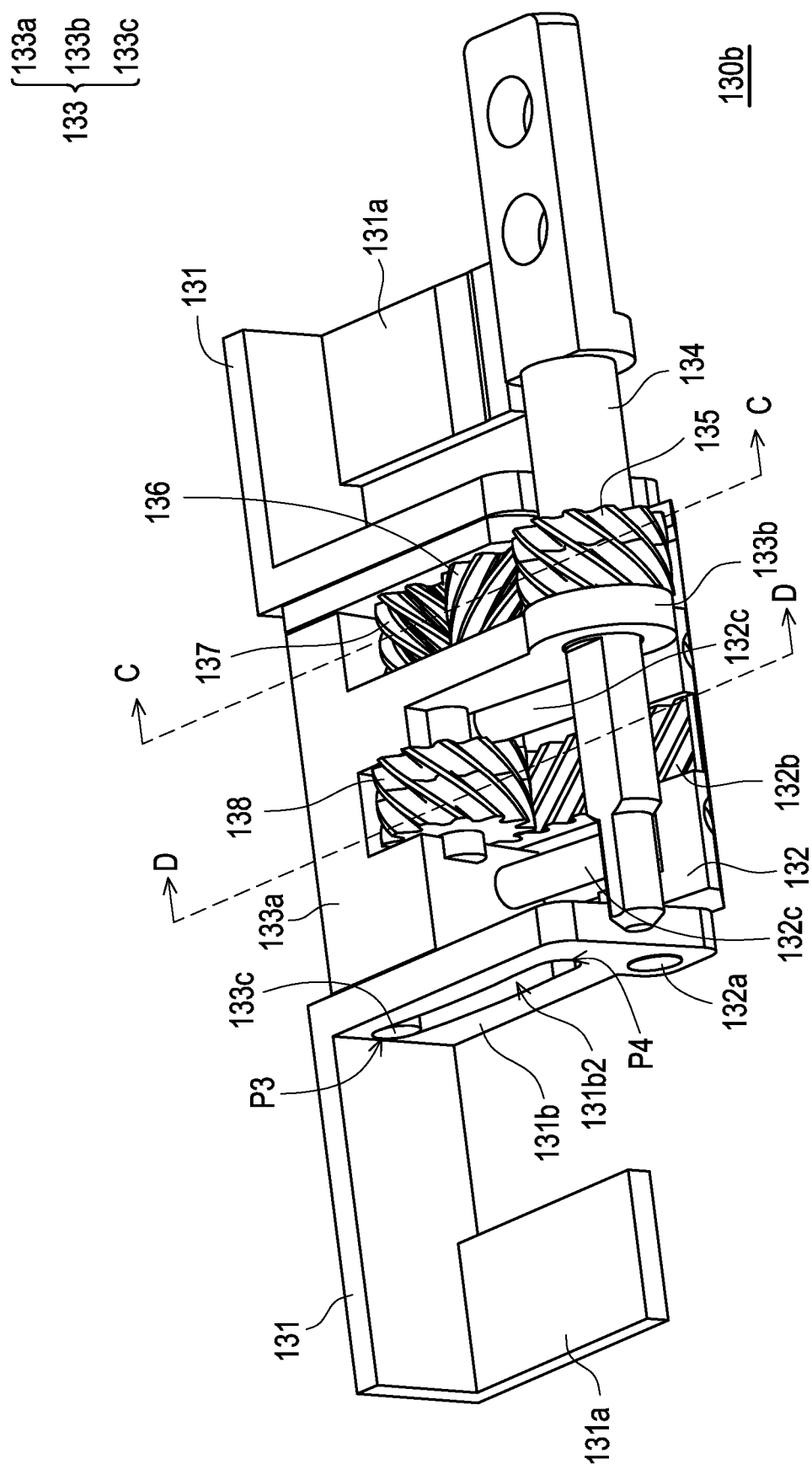
FIG. 6A is a schematic view of a hinge mechanism corresponding to a folded state of a portable electronic device according to yet another embodiment of the disclosure.

FIG. 6A is a schematic view of a hinge mechanism corresponding to a folded state of a portable electronic device according to yet another embodiment of the disclosure. Referring to FIG. 6A, the design principle of a hinge mechanism 130b of this embodiment is substantially the same as the design principle of the hinge mechanism 130a of the previous embodiment, and the main difference between the two mechanisms lies in that the hinge mechanism 130b further includes a fourth gear 138 that is coaxial with the third gear 137. Further, the third gear 137 does not mesh with the rack portion 132b, but the fourth gear 138 meshes with the rack portion 132b instead. When the first gear 135 rotates with the rotating shaft 134, the first gear 135 drives the second gear 136 to rotate, and the second gear 136 drives the third gear 137 to rotate. Since the fourth gear 138 is coaxial with the third gear 137, the fourth gear 138 rotates synchronously with the third gear 137 and slides relative to the rack portion 132b.

Figure 6B:
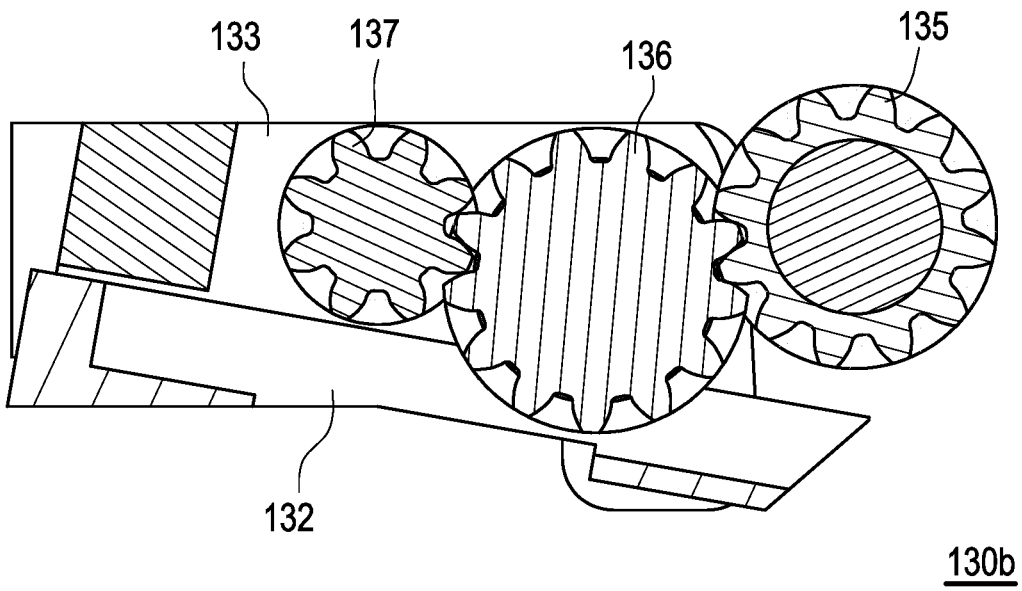
FIG. 6B is a schematic cross-sectional view of FIG. 6A along the section line C-C.
Figure 6C:
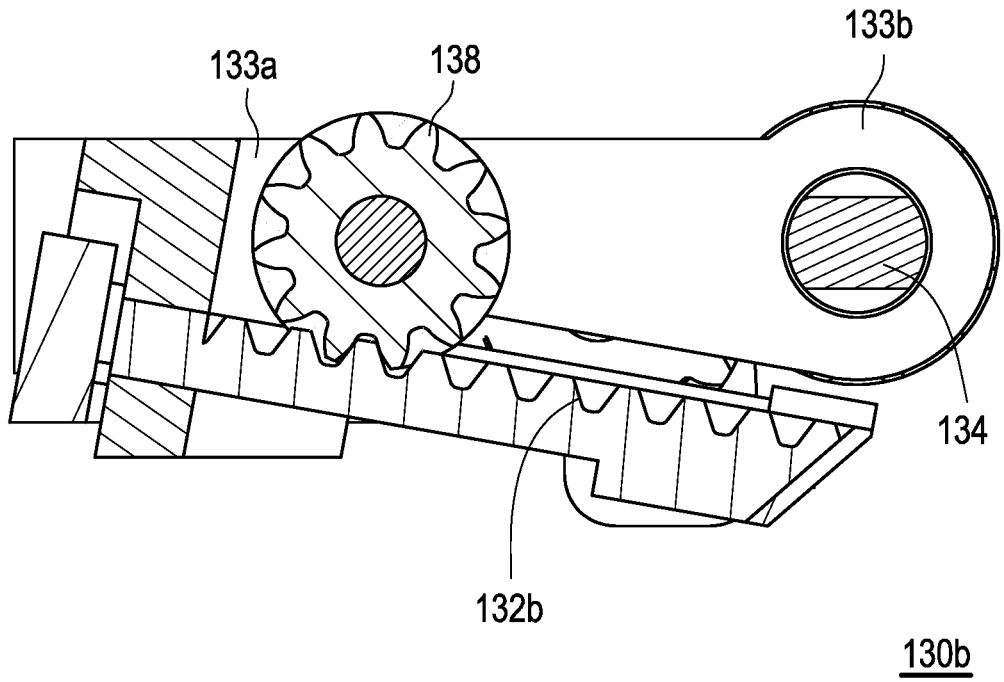
FIG. 6C is a schematic cross-sectional view of FIG. 6A along the section line D-D.

FIG. 6B is a schematic cross-sectional view of FIG. 6A along the section line C-C. FIG. 6C is a schematic cross-sectional view of FIG. 6A along the section line D-D. Referring to FIG. 6A to FIG. 6C, in this embodiment, the number of teeth of the first gear 135 is greater than the number of teeth of the third gear 137, so the rotational speed of the third gear 137 is greater than the rotational speed of the first gear 135. On the other hand, the fourth gear 138 and the third gear 137 are coaxially disposed, so the rotational speed of the fourth gear 138 is the same as the rotational speed of the third gear 137.

Furthermore, the number of teeth of the fourth gear 138 is greater than the number of teeth of the third gear 137, and the rotational speed of the fourth gear 138 is greater than the rotational speed of the first gear 135, which accordingly increases the sliding amount of the fourth gear 138 on the rack portion 132b and thus increases the backward stroke of the lower edge 121 (see FIG. 4A and FIG. 4B) of the second body 120. Therefore, when the second body 120 (see FIG. 4A and FIG. 4B) rotates and unfolds relative to the first body 110 (see FIG. 4A and FIG. 4B), the distance between the lower edge 121 of the second body 120 (see FIG. 4A and FIG. 4B) and the back side 111 of the first body 110 (see FIG. 4A and FIG. 4B) is increased.

To sum up, as the second body rotates relative to the first body, the second body slides relative to the first body to adjust the distance between the lower edge of the second body and the back side of the first body. Further, when the second body rotates and unfolds relative to the first body through the hinge mechanism, the lower edge of the second body slides in a direction away from the back side of the first body to prevent blocking the heat dissipation path on the back side of the first body (that is, the path for discharging the hot air inside the first body to the outside), so as to quickly discharge the hot air from the inside of the first body to the outside. Therefore, the portable electronic device according to the disclosure has excellent heat dissipation efficiency.

Although the disclosure has been described with reference to the above embodiments, they are not intended to limit the disclosure. Those having ordinary knowledge in the art can make changes and modifications without departing from the spirit and scope of the disclosure. Therefore, the scope of the disclosure is defined by the following claims.

What is claimed is:

1. A portable electronic device, comprising:
   a first body;
   a second body; and
   a hinge mechanism, comprising:
   a first bracket fixed to the first body and having a guide groove;
   a rotating shaft fixed to the second body;
   a second bracket rotatably connected to the first bracket and comprising a rack portion located on one side of the guide groove;
   a third bracket rotatably connected to the rotating shaft and slidably connected to the guide groove and slid within the guide groove;
   a first gear fixed to the rotating shaft;
   a second gear rotatably disposed on the third bracket and meshing with the first gear; and
   a third gear rotatably disposed on the third bracket and meshing with the second gear and the rack portion,
   wherein when the rotating shaft rotates with the second body relative to the first body, the first gear drives the second gear to rotate, and the second gear drives the third gear to rotate, so that the third gear slides relative to the rack portion and drives the third bracket to slide along the guide groove, causing the rotating shaft to slide along an arc-shaped path to increase or decrease a distance between a lower edge of the second body and a back side of the first body.

2. The portable electronic device according to claim 1, wherein the first gear, the second gear, and the third gear are helical gears, and the rack portion is a helical rack portion.

3. The portable electronic device according to claim 1, wherein the number of teeth of the second gear is equal to the number of teeth of the third gear.

4. The portable electronic device according to claim 1, wherein the first gear, the second gear, and the third gear have rotation axes parallel to one another.

5. The portable electronic device according to claim 1, wherein the second bracket further comprises a guide rod located on one side of the rack portion, and the third bracket is slidably connected to the guide rod.

6. The portable electronic device according to claim 5, wherein an extending direction of the guide rod is parallel to an extending direction of the rack portion.

7. The portable electronic device according to claim 5, wherein the third bracket comprises a bracket body, a sliding protruding pin, and a pivot portion, wherein the third gear is rotatably disposed on the bracket body, the bracket body is slidably connected to the guide rod, the sliding protruding pin protrudes from the bracket body and is slidably inserted into the guide groove, and the pivot portion extends from the bracket body to the rotating shaft and is pivotally connected to the rotating shaft.

8. The portable electronic device according to claim 1, wherein the second bracket further comprises a pivot shaft pivotally connected to the first bracket and disposed on one side of the guide groove, wherein the guide groove is a guide inclined groove.

9. The portable electronic device according to claim 8, wherein the guide inclined groove is located between the pivot shaft and the rotating shaft, the guide inclined groove has a first stroke end point and a second stroke end point opposite to the first stroke end point, the first stroke end point is located between the pivot shaft and the second stroke end point, and the second stroke end point is located between the first stroke end point and the rotating shaft.

10. The portable electronic device according to claim 8, wherein the pivot shaft is located between the guide arc-shaped groove and the rotating shaft, the guide arc-shaped groove has a first stroke end point and a second stroke end point opposite to the first stroke end point, the second stroke end point is located between the first stroke end point and the pivot shaft, and the pivot shaft is located between the second stroke end point and the rotating shaft.

* * * * *